United States Patent
Gebhart et al.

[11] Patent Number: 5,839,231
[45] Date of Patent: Nov. 24, 1998

[54] WINDOW ASSEMBLY WITH LIGHT

[75] Inventors: Stephen Gebhart, Ponte Vedra Beach, Fla.; Ronnie G. Gipson, Dearborn; James C. Capiak, Three Oaks, both of Mich.

[73] Assignee: Excel Industries, Inc., Elkhart, Ind.

[21] Appl. No.: 691,466

[22] Filed: Aug. 2, 1996

[51] Int. Cl.⁶ .................................................. E06B 3/00
[52] U.S. Cl. ............................................ 49/413; 362/80.1
[58] Field of Search ............................ 49/463, 413, 404; 362/80.1

[56] References Cited

U.S. PATENT DOCUMENTS

| | | | |
|---|---|---|---|
| 3,827,184 | 8/1974 | Pennec et al. | 49/413 X |
| 4,364,596 | 12/1982 | Geisendorfer . | |
| 4,488,141 | 12/1984 | Ohlenforst et al. . | |
| 5,016,145 | 5/1991 | Singleton | 362/80.1 |
| 5,400,225 | 3/1995 | Currie | 362/80.1 X |
| 5,442,880 | 8/1995 | Gipson . | |
| 5,473,840 | 12/1995 | Gillen et al. | 49/413 X |
| 5,522,191 | 6/1996 | Wenner et al. . | |
| 5,522,634 | 6/1996 | Stanesic et al. | 362/80.1 X |
| 5,621,942 | 4/1997 | Eustache et al. | 362/80.1 X |
| 5,669,697 | 9/1997 | Angelo et al. | 362/80.1 X |

FOREIGN PATENT DOCUMENTS

| | | |
|---|---|---|
| 2250324 | 12/1973 | France . |
| 2242316 | 8/1972 | Germany . |

*Primary Examiner*—Jose V. Chen
*Attorney, Agent, or Firm*—Banner & Witcoff Ltd

[57] ABSTRACT

A modular window assembly constructed as a pre-assembled unit for closing an opening in a motor vehicle body is provided with a light assembly mounted in a frame assembly. In those preferred embodiments used as a backlight to close an opening in the sheet metal of a pickup truck, the light assembly may optionally be a high mount stop lamp or brakelight and/or a cargo light. The light assembly may have a housing and structure for connecting the light assembly to a power source. Numerous configurations and kinds of light assemblies may be used. The light assembly may optionally be mounted flush with an exterior surface of the frame. In certain preferred embodiments the frame assembly can have a circumferential main body segment and a halo segment unitary with the main body segment. The light assembly optionally can be mounted in the unitary halo segment. A light assembly, for example, can be used with fixed pane modular windows, single sliding pane modular windows and dual pane sliding modular windows.

21 Claims, 8 Drawing Sheets

WINDOW ASSEMBLY WITH LIGHT

FIELD OF THE INVENTION

The present invention is directed to an improved design for modular window assemblies. More particularly, the invention is directed to window assemblies used in motor vehicles that combine heretofore separate components into a modular window assembly.

BACKGROUND

Modular sliding window assemblies are known for insertion as a pre-assembled unit into a window opening in a motor vehicle. The term modular window is understood by those in the industry to mean a window construction pre-assembled separate from the final assembly of the motor vehicle. Modular windows may have, for example, a frame and at least one pane or windowpane closing an opening. Optionally a sliding pane may be used, permitting an occupant of the vehicle to adjust the size of the opening to the outside of the vehicle. For example, one such recently developed modular sliding window assembly using an injection molded plastic frame is shown in commonly owned U.S. Pat. No. 5,442,880 to Gipson et al. The frame is designed to work in cooperation with a backplate to create an elongate slide channel for a sliding window pane. The window assembly in such designs advantageously is of modular construction, allowing preassembly prior to installation in the motor vehicle. This is especially advantageous for example for use as a backlight in a pickup truck or the like. Good integration of parts can reduce the cost and complexity of the final vehicle assembly. It is an object of the present invention to further advance the use of modular window assemblies in motor vehicles. Additional objects and features of the invention will become apparent from the following disclosure taken together with the detailed discussion of certain preferred embodiments.

SUMMARY

Motor vehicles using modular window assemblies still have had a separate light assembly mounted either in an extra or secondary opening, typically cut into the sheet metal just above the opening for the window assembly. This additional opening increases the likelihood that water may leak into the motor vehicle, potentially damaging the interior of the motor vehicle. A light assembly may also be attached to the inside of the vehicle as a separate component, bolted to the windowpane or the use of indirect lighting may be employed. Given the constant pressure to speed assembly times it would be highly advantageous to eliminate the need for to produce a secondary opening in the sheet metal or perform a secondary operation to attach the light assembly to the vehicle. It would also be highly advantageous to provide a light assembly that can be readily removed and serviced should one or more lights in the light assembly fail. It is an object of the present invention to provide an aesthetically appealing modular window assembly of low cost, with a light assembly incorporated as part of the window assembly thereby eliminating the need for a separate opening in the sheet metal. It is an additional object of the present invention to provide a frame for such a modular window assembly with light assembly. It is an additional object of the present invention to provide a modular sliding window assembly with an integrated light assembly. In accordance with a first aspect, a pre-assembled modular sliding window assembly for installation into an opening of a motor vehicle body, has a frame provided with a main body defining at least a primary aperture. A fixed pane is attached to the frame, sealingly closing the primary aperture. Preferably the frame is composed of a molded circumferential, structurally self-supporting plastic. An exterior light assembly is mounted to the frame and has at least one lamp or light source, at least one corresponding lamp housing and means for connecting the lamp to a power source. Preferably the frame may have an indentation or opening to receive the light assembly. In certain preferred embodiments the frame has lamp housing receiving slots and the lamp housing has flexible projections wherein the light assembly is snap fit into the frame assembly. Alternatively the light assembly may be screwed or bonded to the frame.

The light assembly may include a high mount stop lamp or brakelight, an additional illumination or cargo lamp, or a high mount turn signal light. Optionally, the light assembly may use incandescent lights, florescent lights or light emitting diodes (LEDs) or other suitable illumination sources. Multiple configurations and various combinations of the aforementioned lights and lamps may be used as the light assembly. In accordance with a preferred embodiment enhancing the aesthetics of the exterior of the vehicle, the lamp housing can be mounted generally flush with the exterior surface of the frame.

In accordance with an certain preferred embodiments, the frame may be provided with a unitary halo segment, extending radially from the main body of the frame. The unitary halo extends over a circumferential ledge of the vehicle body on the periphery of the opening, hiding it from view from the exterior of the vehicle. The unitary halo enhances the exterior styling of the vehicle, reduces costs, component parts and assembly steps. The light assembly may be mounted in the unitary halo segment such that one side of the light assembly is flush with an edge of the halo or, alternatively, the light assembly may be mounted elsewhere in the main body of the frame. In certain preferred embodiments the light assembly comprises a stop lamp and at least one cargo lamp and means for connecting the lamps to a power source, such as a battery. The means for connecting the lamps comprises insulated wires leading from the lamp and from the power source and connected through a series of openings in the sheet metal and the back of the frame. Optionally an elastomeric grommet may be placed around the insulated wire and inserted into the sheet metal opening to prevent rain or other outside elements from entering the vehicle. The lamp housing preferably is seated in a recess or indentation in the frame and may have a reflective interior surface and a generally transparent exterior surface or lens. The lens or exterior surface may be clear or colored plastic, and may provide diffraction or focusing of the light from the lamp. For example, in stop lamps a portion of the exterior surface may be colored red. In accordance with a second aspect, a modular window assembly is provided with a sliding window and has an integrated light assembly. In accordance with certain preferred embodiments, a circumferential, plastic, structural frame has a main body and post segments which define primary and secondary apertures. A sliding pane sealingly closes the primary aperture and a fixed pane closes each secondary aperture. The post segments may be unitary with the main body of the frame. The exterior light assembly may be mounted in the frame, optionally flush or non-flush with exterior surface of the frame. The frame may have a circumferential radially extending unitary halo segment, and the light assembly may be mounted in the halo segment. As described above, numerous alternate types of lights and lamps may be used in the light assembly, including incandescent, fluorescent and LED. The light assembly can comprise high mount stop lamps or brakelights, turn signal indicators, cargo lights or any combination of these. In certain preferred embodiments of the modular window assembly with a sliding windowpane and an integrated light assembly, the plastic frame may work in cooperation with a backplate to form upper and lower elongate run channels, and the sliding pane slides in the run channels from an open position in which the primary aperture is open to a closed position in which the sliding pane sealingly closes the primary aperture. In those embodiments where the light assembly is mounted on the exterior side of the frame and over the backplate, the sheet metal, the frame and the backplate all preferably have openings for an insulated wire, and the sheet metal opening may be made watertight by an elastic grommet. In accordance with a third aspect wherein an enlarged opening is desirable, a modular sliding window assembly with an integrated light assembly has a pair of sliding panes which close a primary aperture. The light assembly can be mounted at numerous locations in the frame, depending upon whether the light assembly will be used as a cargo lamp, a high mount stop lamp, a turn signal or otherwise. In accordance with a fourth aspect a molded plastic circumferential frame member is provided for a modular window assembly with an integrated light assembly. The frame member comprises an upper segment and a lower segment, and a pair of lateral segments unitary with the upper and lower segments which form a circumference, and an indentation or opening in the frame member to received a light assembly. In certain alternative embodiments the frame member may have additional post segments within the circumferential frame member, forming in cooperation with the upper and lower segments a primary aperture and at least one secondary aperture. From the foregoing disclosure and the following more detailed description of various preferred embodiments it will be apparent to those skilled in the art that the present invention provides a significant advance in the technology and art of modular motor vehicle window assemblies. Particularly significant in this regard is the potential the invention affords for reduced cost, manufacturing steps and complexity while enhancing exterior styling of motor vehicles. Additional features and advantages of various preferred embodiments will be better understood in view of the detailed description provided below.

BRIEF DESCRIPTION OF THE DRAWINGS

Certain preferred embodiments are discussed below with reference to the appended drawings wherein.

Figure 5:
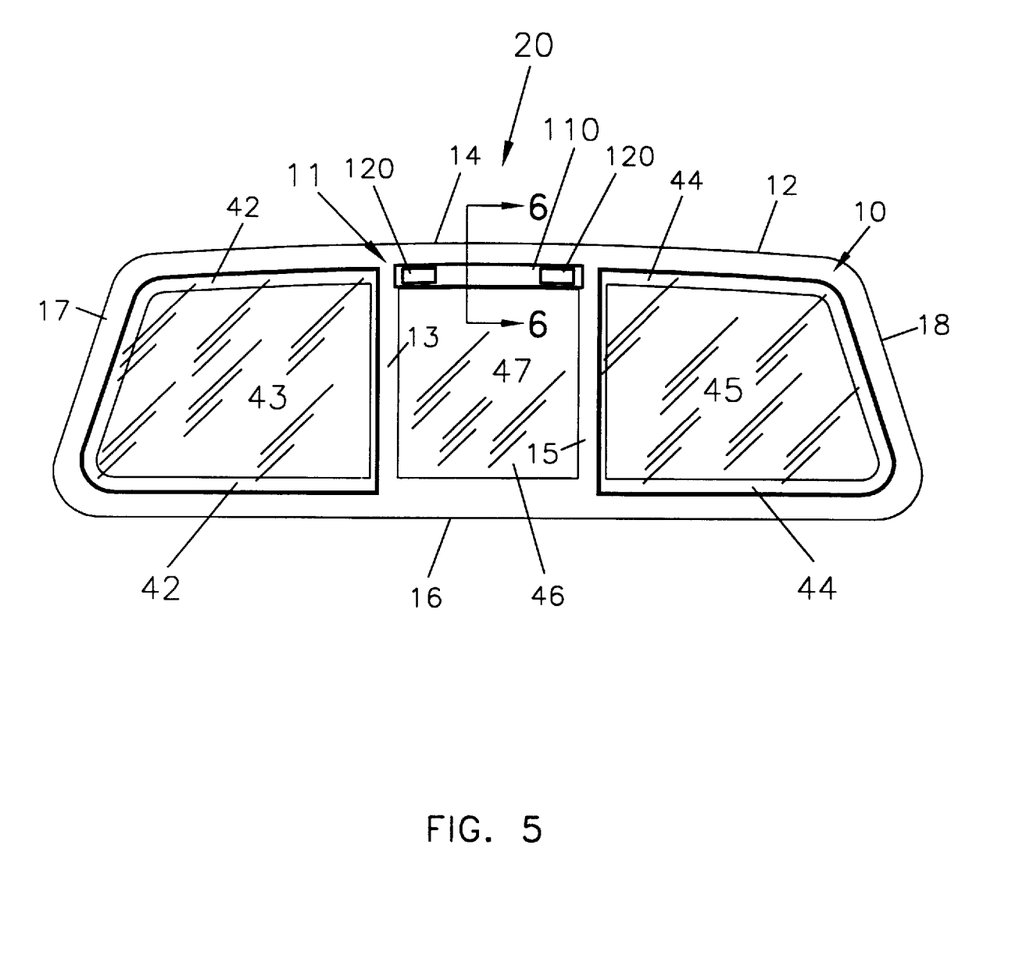
FIG. 5 is a plan view taken from the outboard side of one alternative preferred embodiment of a sliding window assembly with a light assembly wherein the light assembly is mounted generally in an opening in the middle of an upper segment of the frame.

It should be understood that the appended drawings are not necessarily to scale, presenting a somewhat simplified representation of certain preferred embodiments illustrative of the basic principles of the invention. The specific design of modular window assemblies with a light assembly mounted in a frame, in accordance with the invention, including, for example, the specific configuration and dimensions of various components, will be determined in part by the intended application and use environment of the regulator assembly. Certain features of the pre-assembled modular window assembly with a light assembly have been enlarged or distorted relative to others to facilitate visualization and clear understanding. In particular, thin features may be thickened, for example, for clarity of illustration. All references to direction and position, unless otherwise indicated, refer to the orientation of the modular window assemblies illustrated in the drawings. In general directions to the right and left of the windowpane in the plane of the paper in FIG. 5 will be referred to as lateral or left and right directions. The directions normal to the plane of the paper in FIG. 5 are inboard/outboard. It should be understood that modular window assemblies in accordance with the invention can be used in diverse applications.

DETAILED DESCRIPTION OF CERTAIN PREFERRED EMBODIMENTS

It will be apparent to those skilled in the art, that is, to those who have knowledge or experience in this area of technology, that the modular window assembly with an integrated light assembly disclosed herein represents not just an advancement that reduces costs, complexity, manufacturing and assembly time, but also offers opportunities for an aesthetically appealing improvement in exterior styling. The following detailed discussion of various alternative and preferred features and embodiments will illustrate the general principles of the invention by example of modular window assemblies employing a structurally self-supporting plastic frame and suitable for installation as a backlight in the passenger cab of a pickup truck. Other designs, including modular windows with an integrated light assembly employing an encapsulated metal frame will be readily apparent to those skilled in the art given the benefit of this disclosure. Other embodiments suitable for other particular applications, such as for example sliding windows on vans and minivans, will also be readily apparent to those skilled in the art given the benefit of this disclosure.

Figure 1:
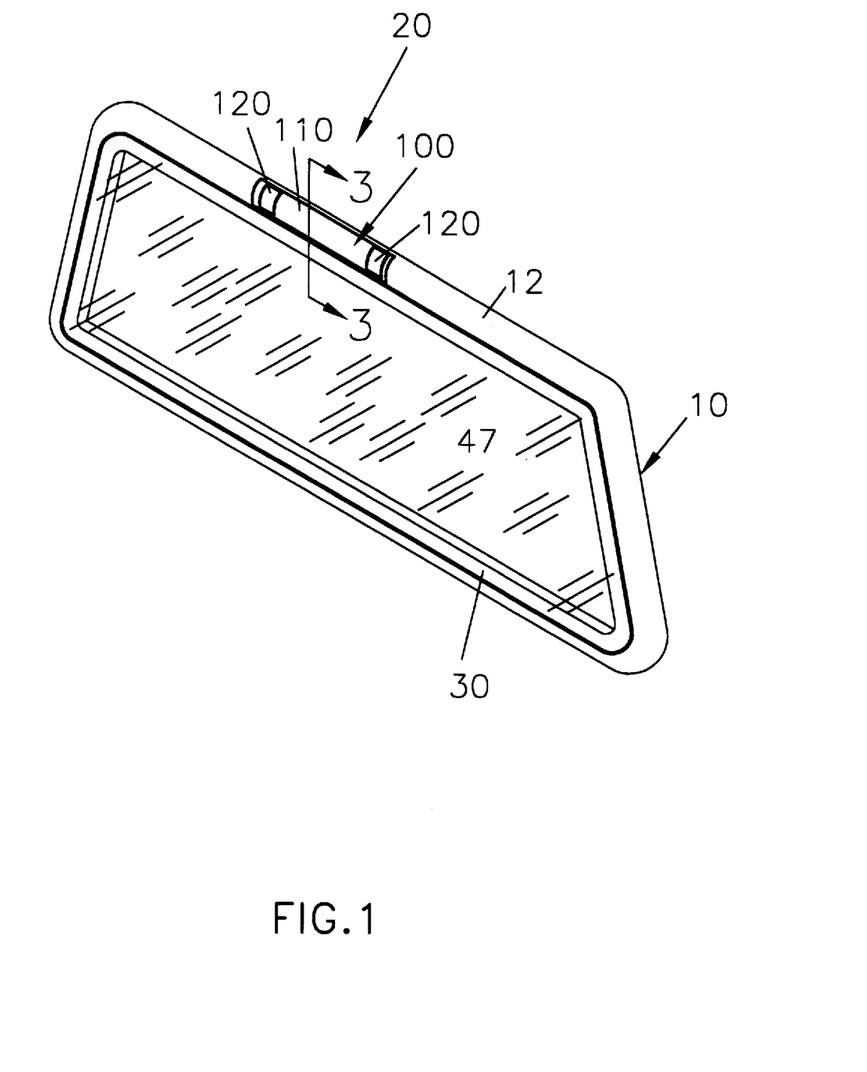
FIG. 1 is a perspective view of a modular window assembly with a light assembly mounted in a frame in accordance with a preferred embodiment.
Figure 2:
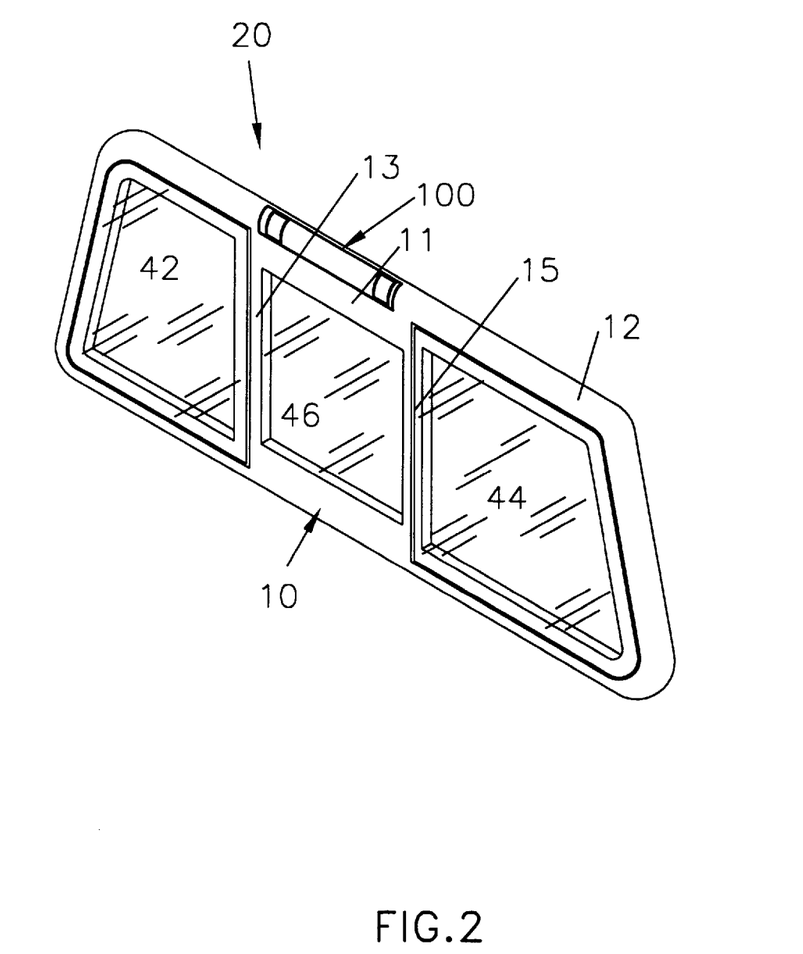
FIG. 2 is a perspective view of a modular sliding window assembly with an attached light assembly in accordance with second preferred embodiment.
Figure 3:
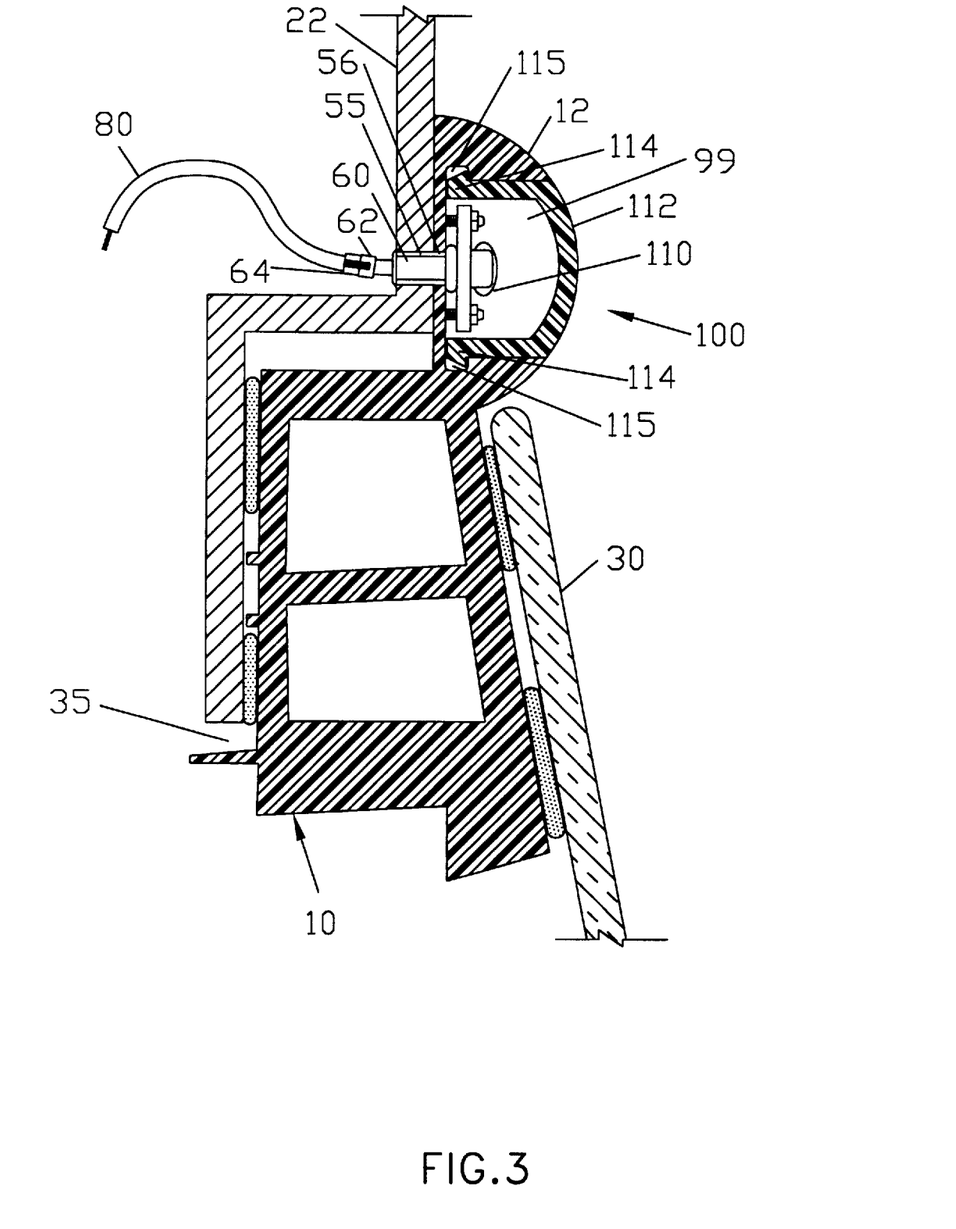
FIG. 3 is a cross section view taken along line 3—3 in FIG. 2 wherein the light assembly is mounted in a halo segment unitary with a main body of the frame.

Referring now to the drawings, FIG. 1 shows a perspective view of a preferred embodiment of a modular window assembly 20 with an integrated light assembly 100. Fixed pane, preferably a windowpane 47 closes a primary aperture defined by a circumferential frame 10. Preferably, the frame is a one-piece structural plastic member. FIGS. 1 and 3 show an optional circumferential radially extending halo segment 12 unitary with the main body 11 of the frame 10. The halo 12 covers a circumferential ledge 45 of the periphery of the vehicle opening 35. As used here the ledge 45 is the bend in the sheet metal where the opening 35 begins. The unitary halo segment 12 has an indentation or opening 99 sized to receive the light assembly 100. Preferably, the light assembly 100 is mounted in the indentation 99 so that the lamp housing 112 is flush with the exterior surface of the halo segment 12 of frame 10. In this embodiment the light assembly 100 is visible from the exterior surface of the motor vehicle.

It should be understood that numerous alternate lights and lamps may be used in the light assembly 100, and that the light assembly may be mounted in numerous locations and configurations on the frame 10 of the window assembly 20 within the scope of the invention. For example, fluorescent lights or light emitting diodes (LEDs) may be used in the light assembly in the place of the incandescent lights shown in the drawings, Moreover, lights serving multiple functions may be attached to the frame 10 either together as one unit or as multiple units positioned about the frame. For example, in FIG. 1 the light assembly 100 may comprise a high mount stop lamp 110 and a pair of cargo lights or lamps 120 which can illuminate the bed of a pickup truck. Alternatively, one of the mounted lamps could be act as a high mount turn signal. FIGS. 4A–4E show numerous alternative light assembly designs with a modular window assembly 20 with at least one sliding pane 46. It should be understood that various alternative light assembly locations and configurations can be used within the scope of this invention on fixed pane modular window assemblies and on modular window assemblies with one or more sliding panes.

Figure 6A:
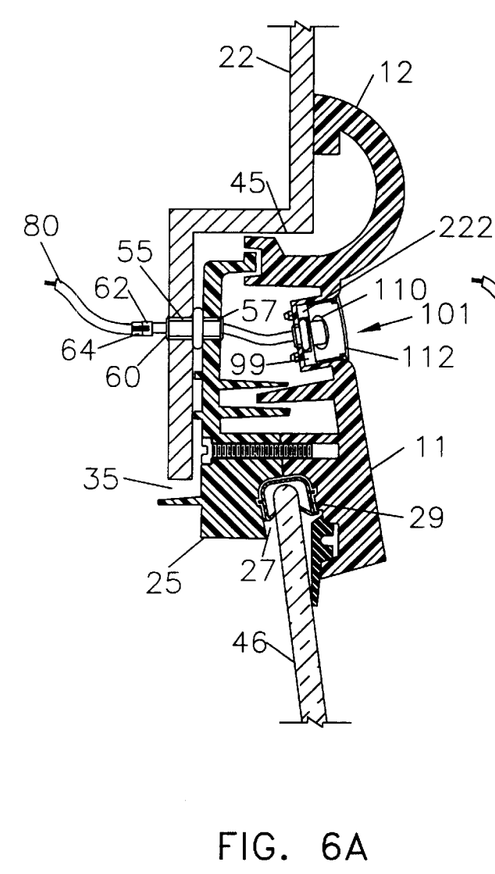
FIG. 6A is a cross sectional view taken along line 6—6 in FIG. 5 revealing a backplate and frame cooperating to form a run channel for a sliding pane and the light assembly is mounted generally flush with the exterior or show surface of the frame.
Figure 6B:
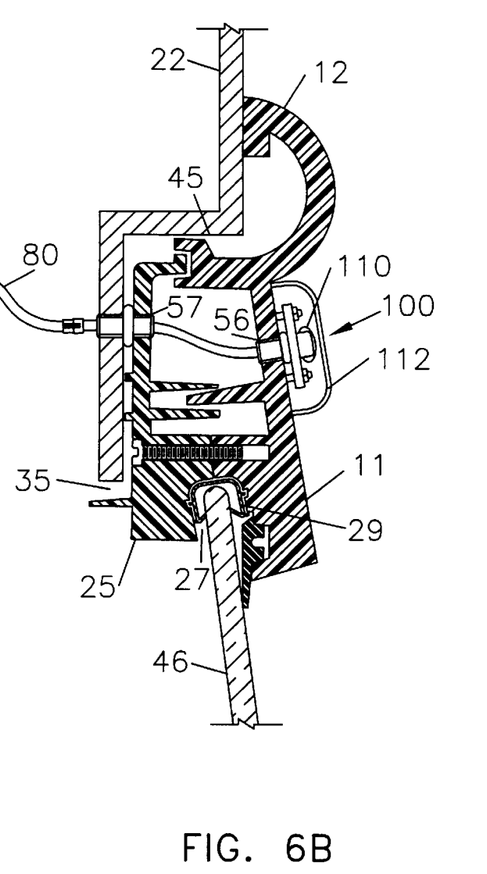
FIG. 6B is a cross sectional view taken along line 6—6 in FIG. 5 revealing an alternative embodiment wherein the light assembly is mounted onto the surface of the frame.

The light assembly 101 may be mounted flush with the exterior surface of the frame 10, as shown in FIGS. 3 and 6A, or if it is desirable to minimize the thickness of the frame, the light assembly 100 may be mounted in a non-flush position as shown in FIG. 6B. Optionally, the light assembly 100 may be mounted in the unitary halo segment such that the light assembly is flush with the top of the frame.

The light assembly 100 may be attached to the frame by numerous methods, such as by screws into holes in the frame, adhesive bonding, or injection molding around the light in an insert molding process. In a preferred embodiment, the light assembly 100 has a lamp housing 112 having at least one flexible projection 114 which allows the light assembly to be snap fit into a corresponding frame slot 115 in the indentation or recess 99 in the frame 10. The lamp housing 112 preferably may have a reflective interior surface 222 and a generally transparent exterior surface or lens. The lens or exterior surface may be clear or colored plastic, and may provide diffraction or focusing of the light from the lamp. For example, in stop lamps a portion of the exterior surface may be colored red. In addition to the lamp housing 112, the light assembly 100 comprises at least one lamp 110, such as a high mount stop lamp, and optional cargo lamps 120, mounted in the lamp housing 112. Means for connecting the lamps to a power source such as the battery of a vehicle can comprise insulated wires 80 connected by male and female connectors 62, 64. As shown in FIG. 3, the wire 80 leading from the lamp 120 passes through an opening 56 in the interior side of the frame 10 and then through an opening 55 in the sheet metal 22 of the vehicle. In a highly advantageous feature of the invention, an elastomeric grommet 60 is fitted around the insulated wire 80 an is compressibly insertable into the sheet metal opening 55. The grommet 60 acts to block water and other exterior elements from entering into the vehicle, and helps reduce rattling and wind noise. Preferably the modular window assembly with an integrated light assembly has a connector 62, either male or female, of sufficiently small diameter that during installation of the modular window into the vehicle the connector 62 may be inserted through the opening 55 in the sheet metal and connected to the corresponding connector 64 such that the connection and wires are hidden in the sheet metal. If the light assembly 100 should need to be serviced or replaced, the connector 64 can be pulled through the opening 55 and disconnected, and a new light assembly can be attached to the wire 80 and reinstalled into the motor vehicle.

The lamp housing 112 may be comprised of a generally transparent plastic material such as an acrylic or polycarbonate, allowing the light from the lamp to pass through unimpeded, or, as in the case of a high mount stop lamp 110 or a turn signal, the lamp housing 112 may be colored. The interior portion of the lamp housing preferably may have a reflective surface to enhance the light emission characteristics of the lamps 110,120.

FIG. 5 shows an alternative preferred embodiment of a modular window assembly 20 with an integrated light assembly 100 and a sliding pane 46. The frame 10 preferably comprises a molded, circumferential, structurally self-supporting plastic member. The frame has a main body 11 with an upper segment 14, a lower segment 16, a pair of lateral segments 17,18 spaced on either lateral side of the upper and lower segments 14,16 and preferably unitary with the upper and lower segments 14,16 to create a circumference. The frame 10 is seen to define a primary aperture 47 between post segments 13,15. The post segments 13,15 are within and unitary with the main body of the frame 10 and define, in cooperation with the upper, lower and lateral frame segments a primary aperture 47 and secondary apertures 43,45. A sliding pane 46 slides from an open position in which a portion of a primary aperture 47 is open to a closed position in which the sliding pane 46 sealingly closes the primary aperture 47. The frame 10 preferably has a unitary radially extending halo segment 12. The fixed panes 42,44 sealingly close corresponding secondary apertures 43,45 and typically are bonded to the frame by a bead of hotmelt adhesive 80, 81, or similar adhesive material.

As best seen in FIGS. 6A and 6B, the upper segment of the frame forms, in cooperation with an upper backplate 25, an elongate run channel 27 in which one edge of the sliding pane 46 slides from a position in which the primary aperture 47 is open to a position in which the sliding pane 46 sealingly closes the primary aperture 47. The lower segment of the frame and a lower backplate form in cooperation an elongate run channel corresponding to, opposing and extending substantially parallel with the upper run channel, captivating an opposite edge of the sliding pane. In this preferred embodiment the frame 10 and the backplates 25 have rabetted surfaces which cooperatively engage one another to form the elongate slide channels 27 extending horizontally to receive the sliding pane 24.

The backplates may be secured to the frame by multiple attachment screws in a screw receiving recess extending through the backplate and into the frame. Upper and lower runners 29 may be employed to produce a sliding surface or U-shaped track of low and even friction for receiving the peripheral edge of the sliding pane 46.

Figure 4A:
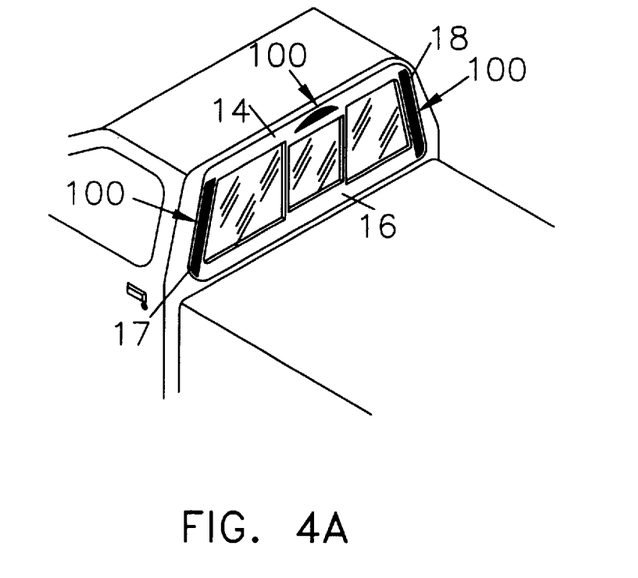
FIG. 4A–4E are perspective views of the modular window assembly with a light assembly revealing examples of alternative embodiments for the light assembly.
Figure 4B:
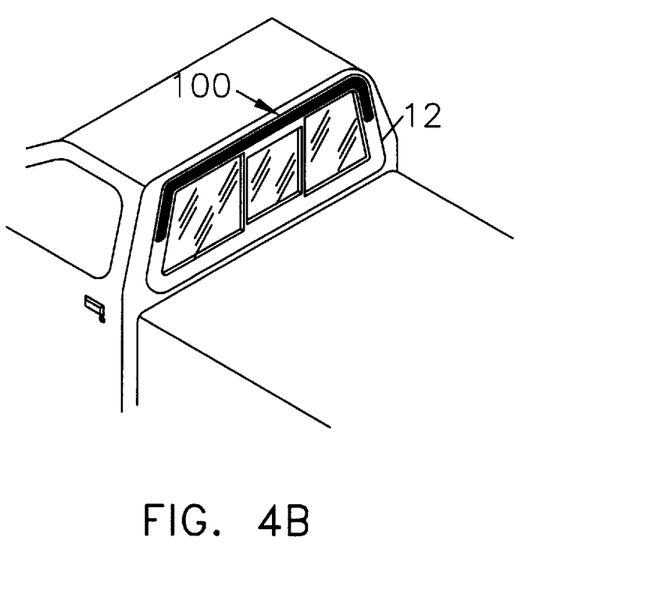
Figure 4C:
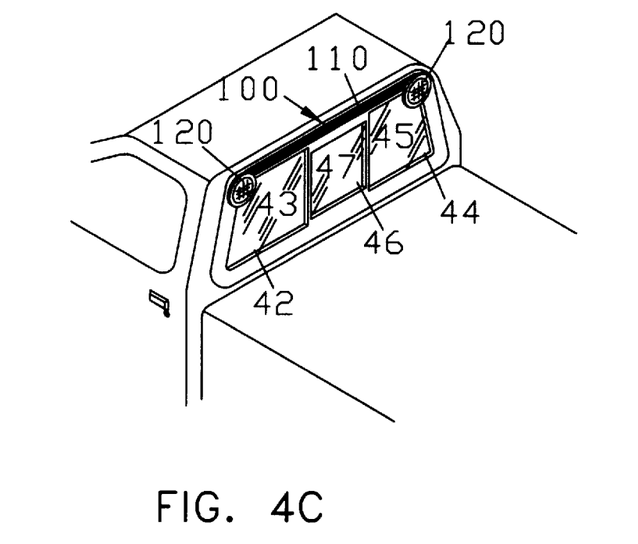
Figure 4D:
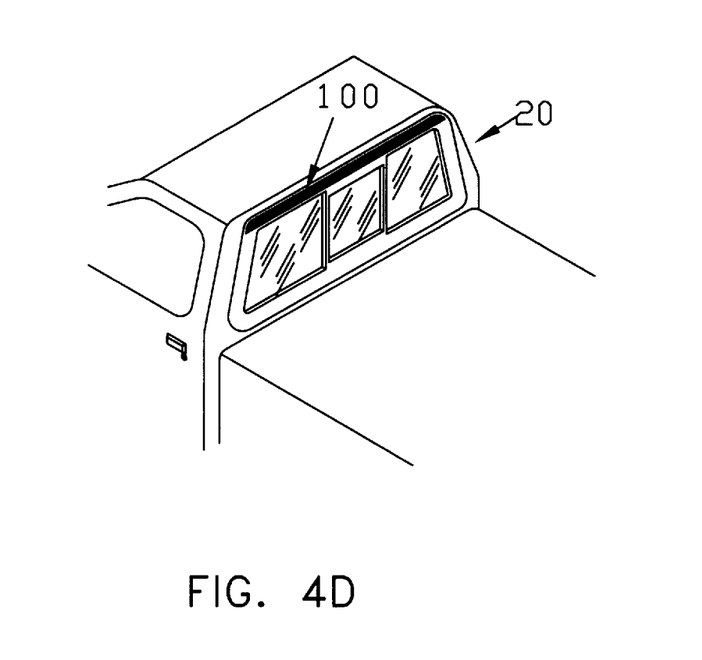
Figure 4E:
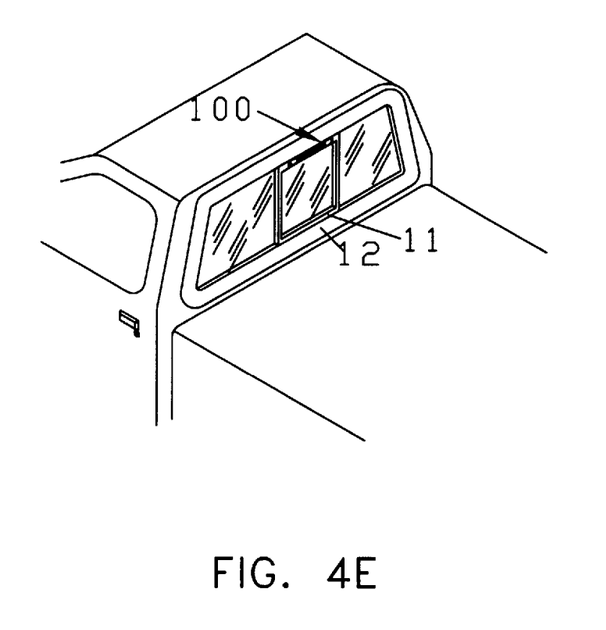

In certain preferred embodiments, a unitary circumferentially halo segment 12 extends radially from the main body 11 of the frame 10 and covers a circumferential ledge 45 around the periphery of the sheet metal opening 35 of the motor vehicle. The light assembly can be mounted in the main body of the frame, as seen in FIGS. 4E and 5, or it can be mounted in the unitary halo segment 12. As with fixed pane modular window assemblies, the light assembly attached to the frame may comprise various kinds of lights or lamps, multiple combinations of lighting fixtures and/or multiple locations of light assemblies all within the scope and spirit of the invention. In FIG. 6A, the light assembly 101 is mounted in the main body of the frame 10 so that the exterior surface of the lens portion of the lamp housing 112, acts as a protective cover for the lamps 110,120 and is generally flush with the exterior surface of the frame 10. In FIG. 6B the light assembly is surface mounted. In both Figs., the backplate is positioned between the frame and the sheet metal 22. To allow access to a power source, an insulated wire can preferably be threaded through an opening 56 in the frame, then through an opening in the backplate 57, and then through an opening in the sheet metal 55. As with fixed pane modular windows with an integrated light assembly, male/female connectors 62,64 connect the light assembly to the power source, and an elastomeric grommet 60 is positioned about the insulated wire and compressibly insertable into the sheet metal opening 55 to prevent water and other elements from entering the vehicle.

In certain sliding window designs it is deemed desirable to increase the size of the primary aperture. Often this is accomplished with a pair of sliding panes sliding in slide channels formed at least in part by the frame extending substantially parallel with one another. It will be apparent from this disclosure that modular window assemblies employing a pair of sliding panes may integrate a light assembly into the frame in a manner similar to that of fixed pane modular sliding window assemblies and single sliding pane modular window assemblies. In view of the foregoing disclosure, those who are skilled in this area of technology will recognize that various modifications and additions can be made to the preferred embodiments discussed above without departing from the true scope and spirit of the invention. All such alternative embodiments are intended to be covered by the following claims.

What is claimed is:

1. A modular window assembly for closing a window opening in a motor vehicle body, comprising, in combination:
    a circumferential frame having an exterior surface and an interior surface;
    a window pane mounted by the frame and cooperating with the frame to close the window opening; and
    at least one exterior light assembly comprising a stop lamp and at least one cargo lamp, the light assembly being mounted in a recess in the frame and electrical connection means for electrically connecting the light assembly to a power source.

2. The modular window assembly of claim 1 wherein the electrical connection means for electrically connecting the lamp to a power source comprises a wire and a wire opening in the interior surface of the frame to receive the wire.

3. The modular window assembly of claim 2 wherein the electrical connection means for electrically connecting the lamp to a power source further comprises a water tight grommet positioned around the wire and snugly insertable into the sheet metal opening.

4. The modular window assembly of claim 1 wherein the stop lamp is mounted between a pair of cargo lamps each mounted to the frame.

5. The modular window assembly of claim 1 further comprising a lamp housing comprising a lens which is mounted generally flush with the exterior surface of the frame.

6. The modular window assembly of claim 1 wherein the frame has a lamp housing receiving slot located within the recess and the light assembly further comprises a corresponding projection that snap fits into the slot.

7. The modular window assembly of claim 1 wherein the frame comprises a molded, circumferential, structurally self-supporting plastic frame comprising a main body.

8. A modular window assembly for closing a window opening in a motor vehicle body, comprising, in combination:
    a molded, circumferential, structurally self-supporting frame having an exterior surface and an interior surface, and comprising a main body, wherein the main body of the plastic frame has an upper segment, a lower segment, and a pair of lateral segments connecting the upper segment to the lower segment, and the frame further comprising a halo segment unitary with the main body of the frame and radially extending away from the window opening;
    a window pane mounted by the frame and cooperating with the frame to close the window opening: and
    at least one exterior light assembly comprising a lamp mounted in a recess in the frame and electrical connection means for electrically connecting the lamp to a power source.

9. The modular window assembly of claim 8 wherein the light assembly is mounted to the unitary halo segment of the plastic frame.

10. A modular window assembly closing an opening in a motor vehicle body, having a circumferential ledge about the periphery of the opening, the modular window assembly comprising, in combination:
    a frame defining at least a primary aperture, and having an exterior surface and an interior surface and forming at least in part elongate slide channels extending substantially parallel with one another;
    a transparent slidable pane having peripheral edges in the slide channels and being slidable between a closed position in which it sealingly closes the primary aperture and an open position in which at least a portion of the primary aperture is open; and
    a light assembly mounted to the frame, comprising at least one lamp, means for connecting the lamp to a power source and means for securing the light assembly to the frame.

11. The modular window assembly of claim 10 wherein the frame comprises a molded, circumferential, structurally self-supporting plastic member having a main body, an exterior surface and an interior surface.

12. The modular window assembly of claim 11 wherein the frame further comprises a backplate attached to the plastic member and forming, in cooperation with the plastic member, the elongate slide channels extending substantially parallel each other on opposed sides of the primary aperture.

13. The modular window assembly of claim 11 wherein the main body of the plastic frame comprises:
    a horizontal upper segment;
    a horizontal lower segment;
    a pair of substantially parallel laterally spaced segments unitary with and interconnecting the upper segment and the lower segment; and
    a pair of laterally spaced post segments unitary with and interconnecting the upper and lower segments forming, in cooperation with the main body of the frame, the primary aperture and a pair of secondary apertures;
    the frame further comprises a halo segment unitary with the main body, extending radially away from the primary aperture and covering the circumferential ledge.

14. The modular window assembly of claim 13 wherein the light assembly is mounted to the unitary halo segment of the plastic frame.

15. The modular window assembly of claim 10 wherein the means for connecting the lamp to a power source comprises an insulated conductive wire, a sheet metal wire opening near the circumferential ledge, a water tight grommet positioned around the wire and snugly insertable into the sheet metal opening, a wire opening in the backplate and a wire opening in the frame to receive the wire.

16. The modular window assembly of claim 10 wherein the lamp is a stop lamp mounted to the frame and the light assembly further comprises at least one cargo lamp mounted to the frame and means for connecting the cargo lamp to the power source.

17. The modular window assembly of claim 10 wherein the lamp housing is mounted generally flush with the exterior surface of the frame.

18. The modular window assembly of claim 10 wherein the means for securing the light assembly to the frame comprises lamp housing receiving slots and flexible projections that snap fit into the slots.

19. A modular sliding window assembly for closing an opening in a motor vehicle body, the opening having a circumferential ledge formed about its periphery, the modular window assembly comprising, in combination:

a frame having an exterior surface and an interior surface, defining at least a primary aperture, and at least in part elongate slide channels extending substantially parallel with one another;

a pair of transparent sliding panes having peripheral edges in the slide channels and being slidable between a closed position in which the panes close the primary aperture and an open position in which at least a portion of the primary aperture is open; and a light assembly mounted to the frame, comprising at least one stop lamp, an at least partially translucent lamp housing, means for connecting the lamp to a power source and means for securing the light assembly to the frame.

20. The modular sliding window assembly of claim 19 wherein the frame comprises a molded, circumferential, structurally self-supporting plastic frame having a main body segment defining at least the primary aperture.

21. The modular sliding window assembly of claim 20 wherein the plastic frame has a circumferential halo segment unitary with the main body segment, extending radially away from the primary aperture and covering the circumferential ledge, and the light assembly is mounted on the halo segment of the plastic frame.

\* \* \* \* \*